US005245174A

United States Patent [19]
Prikryl et al.

[11] Patent Number: 5,245,174
[45] Date of Patent: Sep. 14, 1993

[54] FOCUS SENSING APPARATUS UTILIZING A REFLECTING SURFACE HAVING VARIABLE REFLECTIVITY

[75] Inventors: Ivan Prikryl; Curtis A. Shuman; Hollis O'Neal Hall, II, all of Colorado Springs, Colo.

[73] Assignee: Applied Magnetics Corporation, Goleta, Calif.

[21] Appl. No.: 902,751

[22] Filed: Jun. 23, 1992

Related U.S. Application Data

[63] Continuation of Ser. No. 597,428, Oct. 15, 1990, abandoned.

[51] Int. Cl.$^5$ .............................................. G01J 1/26
[52] U.S. Cl. ................................ 250/201.5; 359/638; 369/44.12
[58] Field of Search ......................... 250/201.5, 201.4; 359/638-640, 831, 837, 839; 369/44.12, 44.35

[56] References Cited

U.S. PATENT DOCUMENTS

| | | | |
|---|---|---|---|
| 2,240,988 | 5/1941 | Hertel | 359/638 |
| 2,432,432 | 12/1947 | MacNeille . | |
| 3,536,375 | 10/1990 | Mansell . | |
| 3,652,167 | 3/1972 | Smith . | |
| 3,677,621 | 7/1972 | Smith . | |
| 3,844,638 | 10/1974 | Lingenfelder et al. . | |
| 3,922,069 | 11/1975 | Kishikawa et al. . | |
| 3,976,828 | 8/1976 | Jansen . | |
| 3,992,574 | 11/1976 | Bouwhuis et al. . | |
| 4,110,011 | 8/1978 | Tausch | 359/839 |
| 4,123,652 | 10/1978 | Bouwhuis . | |
| 4,253,723 | 3/1981 | Kojima et al. . | |
| 4,334,300 | 6/1982 | Arquie et al. . | |
| 4,358,200 | 11/1982 | Heemskerk et al. . | |
| 4,399,529 | 8/1983 | Leterme et al. . | |
| 4,411,492 | 10/1983 | Bluege . | |
| 4,411,500 | 10/1983 | Yonezawa et al. . | |
| 4,422,168 | 12/1983 | Ito et al. . | |
| 4,423,495 | 12/1983 | Musha | 250/201.5 |
| 4,423,496 | 12/1983 | Opheij et al. . | |

(List continued on next page.)

OTHER PUBLICATIONS

Bouwhuis, et al., "Read-out of Optical Disk" in Principles of Optical Disk Systems, Adam Hilger Ltd., Bristol and Boston, pp. 70-80 (1985).

(List continued on next page.)

FOREIGN PATENT DOCUMENTS

| | | |
|---|---|---|
| 0259148 | 9/1987 | European Pat. Off. . |
| 0219640 | 11/1985 | Japan . |
| 0271631 | 12/1986 | Japan . |
| 0289539 | 12/1986 | Japan . |

*Primary Examiner*—David C. Nelms
*Assistant Examiner*—Stephone B. Allen
*Attorney, Agent, or Firm*—Knobbe, Martens, Olson & Bear

[57] ABSTRACT

An apparatus for evaluation of radiation beam geometry that finds application in determining the focus of an illuminating beam relative to an optical disk is disclosed herein. In one preferred embodiment, a light source generates a linearly polarized beam which is collimated by a collimating lens. The collimated beam is then converged by an objective lens onto the surface of the optical disk. The disk reflects the illuminating beam focused thereon back through the objective lens to a beam splitter. A portion of the optical energy incident on the beam splitter is then redirected to form a servo beam, wherein the degree of collimation of the servo beam is indicative of the focus position of the illuminating beam. A beam separation module, based on frustrated total reflection, having a reflectivity which varies in response to the angle of incidence of optical energy thereon is positioned to intercept the servo beam. The beam separation module is operative to separate the servo beam into transmitted and reflected beams of substantially similar shape and intensity. Electrical signals produced by photodetective elements in response to incidence of the transmitted and reflected beams thereon may then be used to generate a focus error signal.

44 Claims, 3 Drawing Sheets

U.S. PATENT DOCUMENTS

| | | |
|---|---|---|
| 4,425,636 | 1/1984 | Musha .................... 250/201.5 |
| 4,441,175 | 4/1984 | Shuman . |
| 4,447,722 | 5/1984 | Saimi . |
| 4,449,213 | 5/1984 | Noborimoto et al. . |
| 4,450,547 | 5/1984 | Nakamura et al. . |
| 4,453,239 | 6/1984 | Musha .................... 250/201.5 |
| 4,455,085 | 6/1984 | Kato et al. . |
| 4,458,980 | 7/1984 | Ohki et al. . |
| 4,475,182 | 10/1984 | Hosaka . |
| 4,489,408 | 9/1985 | Verhoeven et al. . |
| 4,497,534 | 2/1985 | Sincerbox . |
| 4,502,783 | 3/1985 | Lau et al. . |
| 4,504,935 | 3/1985 | Jansen . |
| 4,504,938 | 3/1985 | Tajima . |
| 4,507,766 | 3/1985 | Saimi et al. . |
| 4,514,837 | 4/1985 | Van Rosmalen . |
| 4,525,625 | 6/1985 | Abe . |
| 4,542,492 | 9/1985 | Leterme et al. . |
| 4,577,941 | 3/1986 | Kubota .................... 359/640 |
| 4,587,644 | 5/1986 | Fujjie . |
| 4,596,444 | 6/1986 | Ushida . |
| 4,611,317 | 9/1986 | Takeuchi et al. . |
| 4,612,437 | 9/1986 | Ohsato . |
| 4,614,863 | 9/1986 | Sato . |
| 4,624,526 | 11/1986 | Tsukai et al. . |
| 4,641,926 | 2/1987 | Shirasaki . |
| 4,644,516 | 2/1987 | Musha . |
| 4,669,073 | 5/1987 | Wakabayashi et al. . |
| 4,669,823 | 6/1987 | Iguma et al. . |
| 4,689,481 | 8/1987 | Ono . |
| 4,689,779 | 8/1987 | Hayashi et al. . |
| 4,691,098 | 9/1987 | Maeda . |
| 4,694,447 | 9/1987 | Cohen et al. . |
| 4,701,603 | 10/1987 | Dakin et al. . |
| 4,707,648 | 11/1987 | Minami .................... 369/44.34 |
| 4,707,817 | 11/1987 | Yoshio . |
| 4,716,559 | 12/1987 | Hine . |
| 4,730,294 | 3/1988 | Funada . |
| 4,730,295 | 3/1988 | Bressers . |
| 4,733,065 | 3/1988 | Hoshi et al. . |
| 4,740,946 | 4/1988 | Yumara et al. . |
| 4,763,314 | 8/1988 | MacCaslin et al. . |
| 4,794,586 | 12/1988 | Korth . |
| 4,797,868 | 1/1989 | Ando . |
| 4,819,220 | 4/1989 | Myazaki et al. . |
| 4,823,335 | 4/1989 | Shikama et al. . |
| 4,823,336 | 4/1989 | Inada et al. . |
| 4,862,442 | 8/1989 | Tadokoro .................... 250/201.5 |
| 4,876,680 | 10/1989 | Misawa et al. . |
| 4,890,273 | 12/1989 | Takeuchi et al. . |
| 4,891,798 | 1/1990 | Shinikai . |
| 4,899,327 | 2/1990 | Bates et al. . |
| 4,911,534 | 3/1990 | Henegouwen et al. . |
| 4,913,528 | 4/1990 | Hasegawa .................... 359/638 |
| 4,922,477 | 5/1990 | Miura . |
| 4,937,440 | 6/1990 | Hofer et al. . |
| 5,002,365 | 3/1991 | DeJager et al. .................... 359/640 |

OTHER PUBLICATIONS

Bouwhuis et al., "Recording and Reading of Information on Optical Disks", in Applied Optics and Optical Engineering, R. R. Shannon and J. C. Wyant, eds., Academic Press, Inc., New York, vol. IX, pp. 101-110 (1983).

Cohen et al., "Automatic Focus Control: The Astigmatic Lens Approach", in Applied Optics, vol. 23, pp. 565-570, Feb. 15, 1984.

Yamamoto et al., "Optical Pregroove Dimensions: Design Considerations", in Applied Optics, vol. 25, No. 22, pp. 4031-4034, Nov. 15, 1986.

Arai et al., "New Focusing Method for Draw-Type Optical Head" in Optical Data Storage, Optical Society of America, Washington, D.C., pp. 1-4, Oct. 15-17, 1985.

Equichi et al., "An 86mm magneto-optical disk drive with a compact and fast-seek-time optical head", from the Optical Data Storage Conference, Vancouver, Mar., 1990.

Prototype Specification Sheet for a magneto-optical disk drive, by Hitachi Product Brochure for the Model SMO-501 Optical Disk Drive, by Sony.

Yoshizumi et al., "Fast Access Actuator for Optical Disk Memory", SPIE, pp. 1-4, 1985.

Product Brochure for the Model NE-5001 Half Height Optical Disk Drive, Nov., 1989 by the Nissho Electronics Corporation.

Yamanaka et al., "Compact Magneto-Optical Disk Head Integrated with Chip Elements", OSA/SPIE/IEEE 1991 Technical Digest Series, vol. 5, pp. 138-141, Feb. 25-27, 1991.

Musha et al., "An Optical Head for Digital Audio Discs (DAD)", Research Dept., Research and Development Division, Olympus Optical Co., Ltd. 2951, Ishikawa-cho, Hachioji-shi, Tokyo, Japan 192.

FOCUS SENSING APPARATUS UTILIZING A REFLECTING SURFACE HAVING VARIABLE REFLECTIVITY

This application is a continuation of application Ser. No. 07/597,428, filed Oct. 15, 1990 now abandoned.

BACKGROUND OF THE INVENTION

1. Field of the Invention

The present invention relates generally to radiation beam geometry evaluation, and finds application in optical recording and playback systems. In particular, the present invention relates to arrangements used to monitor the focus position of a light beam with respect to an optical disk.

2. Background of the Invention

Optical recording and playback systems, such as those utilizing optical memory disks, compact disks, or video disks, require precise focusing of an illuminating optical beam through an objective lens onto the surface of an optical disk. The incident illuminating beam is generally reflected back through the objective lens, and is then used to read information stored on the disk. Subsequent to passing back through the objective lens, a portion of the reflected beam is typically directed to an apparatus designed to gauge the focus of the illuminating beam on the disk. Information extracted from the reflected beam by this apparatus may then be used to adjust the focus of the illuminating beam by altering the position of a movable objective lens relative to the disk.

A number of techniques for detecting the focus of an illuminating optical beam are known. For example, U.S. Pat. Nos. 4,423,495, 4,425,636 and 4,453,239 employ what has been termed the "critical angle prism" method of determining beam focus. In this method an illuminating beam reflected from a storage disk is made incident upon a detection prism surface which is set very close to a critical angle with respect to the reflected illuminating beam. When the focus of the illuminating beam on the surface of the disk deviates from a desired state, the variation in the amount of optical energy reflected by the detection prism surface may be used to derive a focus error signal used to adjust the focus of the illuminating beam.

The critical angle prism method generally requires that the orientation of the detection prism surface relative to the reflected illuminating beam be precisely adjusted. This requirement arises as a result of discontinuities in the reflectivity characteristic of the detection prism in the neighborhood of the critical angle and makes focus error detection systems based on this method extremely sensitive. However, the critical angle technique has several disadvantages. First, the focus error signal it produces depends on the light reflection at the interface between the detection prism surface and air; thus, changes in altitude, which change the index of refraction of the air, can cause false focus readings (offsets) to occur. Also, the critical angle technique is inherently unsuitable for use in differential focus sensing systems.

Differential systems are increasingly important because they allow cancellation of certain types of noise that can occur in optical disk drives. The critical angle method is unsuited to differential operation for two reasons. First, the transmitted beam produced by the sensing prism is compressed along one axis, making it unsymmetrical with the reflected beam. Symmetry of the two beams is preferred in a differential system to optimize the noise-cancellation properties in varied environments. Second, at the point on the reflectivity curve of a critical angle prism where the intensities of the two beams are balanced, the slope is far too low to produce a useful differential focus error signal.

A focus detecting apparatus which requires somewhat less precise adjustment of the optical surface on which the reflected illuminating beam is incident, when compared to the critical angle technique is disclosed in U.S. Pat. No. 4,862,442. In particular, the optical surface described therein comprises a dielectric multilayer coating having a reflectivity which varies continuously with respect to the angle of incidence of the reflected illuminating beam. It follows that rotational maladjustment of the surface comprising the multilayer coating will have smaller effect on the value of the focus error signal, but that also the technique will have reduced angular sensitivity. Also, inaccuracies in the focus error signal produced by multilayer dielectric systems may develop in response to relatively slight changes in the wavelength of the reflected illuminating beam. Such sensitivity to wavelength changes is undesirable since the focus error signal is designed to relate solely to the focus of the illuminating beam.

In addition, certain systems using a dielectric multilayer reflecting surface provide focus error signals having only a limited degree of sensitivity. For example, FIG. 2 of U.S. Pat. No. 4,862,442 shows a particular reflectivity characteristic for a layered dielectric reflecting surface, with the slope of the reflectivity characteristic being proportional to the sensitivity of the focus error signal. The disclosed reflected intensity ranges in value from approximately 0.75 to 0.05 over angles of incidence extending from 42 to 48 degrees. This reflectivity change of approximately 10% per degree produces a focus error signal of relatively low sensitivity.

Accordingly, a need in the art exists for an optical arrangement characterized by a reflectivity profile which allows generation of a highly sensitive focus error signal relatively immune to changes in altitude and to chromatic aberration, and which is capable of use in differential systems.

SUMMARY OF THE INVENTION

The present invention comprises an improved apparatus and method for radiation beam geometry evaluation, and provides a focus detection apparatus designed to satisfy the aforementioned needs. The inventive focus sensing apparatus includes a beam separation module which provides a pair of well-balanced beams, either of which may be used to produce a focus error signal, and which also may be used together to produce a differential focus error signal. Moreover, certain physical parameters of the beam separation module may be varied to adjust the dynamic range of the apparatus and its sensitivity to changes in the focus of an illuminating beam.

Accordingly, the present invention relates to a focus sensing apparatus comprising: a substantially monochromatic light source, an optical focusing arrangement including an objective lens, a beam separation module, and a photodetective element. In one preferred embodiment of the present invention, the light source generates a substantially linearly polarized beam which is collimated by a collimating lens. The collimated beam is directed by an optical beamsplitting arrangement to an objective lens, which then converges the beam onto the surface of the optical disk. The disk reflects the beam focused thereon back through the objective lens to the beamsplitting arrangement. A portion of the optical energy incident on the beamsplitting arrangement is then redirected to form a servo beam, with the beam separation module being positioned to intercept the servo beam. The beam separation module is operative to separate the servo beam into transmitted and reflected beams of preferably similar shape and intensity. Electrical signals produced by photodetective elements in response to variations in the intensity profiles of the transmitted and reflected beams may then be used to differentially generate a focus error signal.

In a particular preferred embodiment of the present invention the beam separation module is a "frustrated total reflection" (FTR) prism which includes a separation layer which is sandwiched between a pair of glass members. The index of refraction of the separation layer is selected to be less than that of the surrounding glass, with the chosen indices of refraction defining the appropriate angle at which the FTR prism should be positioned relative to the servo beam. In addition, the thickness of the separation layer may be adjusted in accordance with the desired sensitivity of the differential focus error signal.

These and other objects and features of the present invention will become more fully apparent from the following description and appended claims taken in conjunction with the accompanying drawings.

DETAILED DESCRIPTION OF THE PREFERRED EMBODIMENTS

Figure 1:
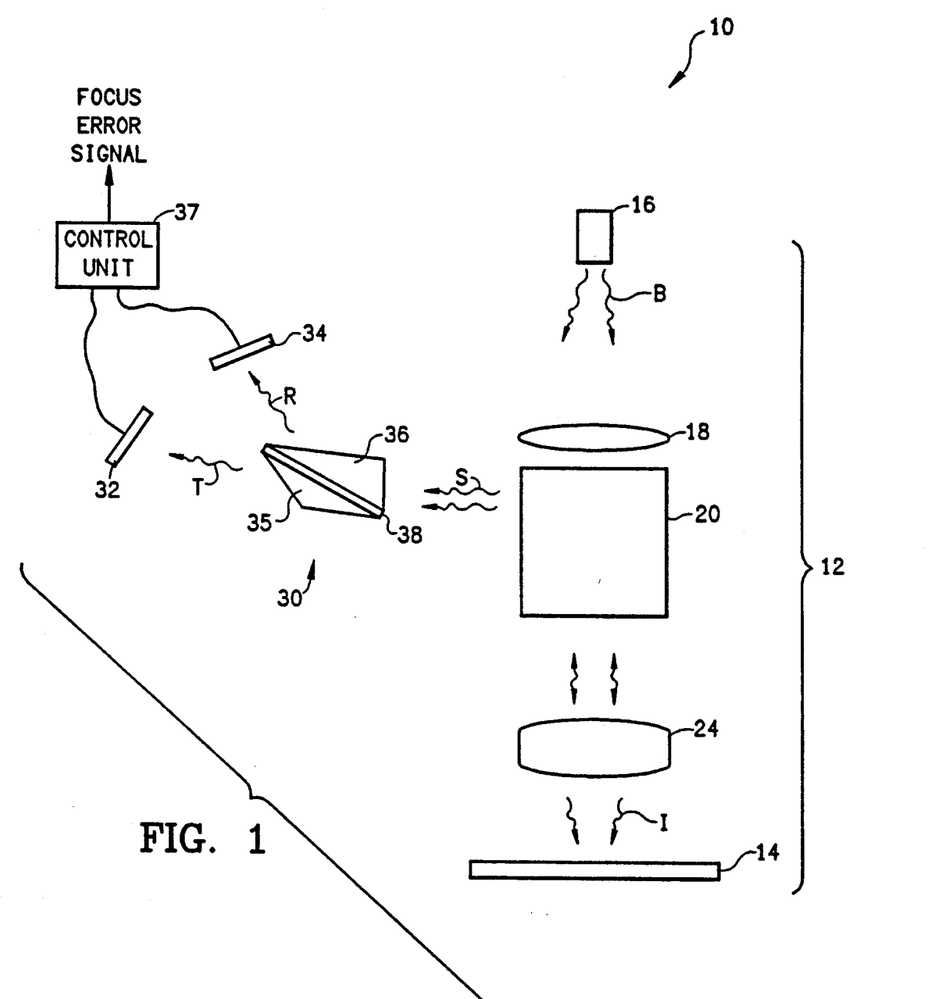
FIG. 1 is a block diagrammatic presentation of a preferred embodiment of the beam focus sensing apparatus of the present invention.

FIG. 1 is a block diagrammatic representation of a preferred embodiment of the beam focus sensing apparatus 10 of the present invention. The apparatus 10 includes an optical arrangement 12 for providing a servo beam S indicative of the focus of an illuminating beam I upon an optical disk 14. The servo beam S comprises a portion of the illuminating beam I reflected by the disk 14. Techniques for generating such a servo beam are well known to those skilled in the art. For example, an optical system such as the optical arrangement 12 for generating the servo beam S is described in U.S. Pat. No. 4,862,442, which is herein incorporated by reference. A brief summary of the operation of the optical arrangement 12 is set forth below.

As shown in FIG. 1, the optical arrangement 12 includes a laser source 16 which generates a linearly polarized beam B. The beam B is collimated by a collimating lens 18, and the collimated beam is directed by an optical beamsplitting arrangement 20 to an objective lens 24. The collimated beam is then converged by the objective lens 24 onto the surface of the optical disk 14. The optical disk may, for example, comprise a compact disk, video disk, or optical memory disk. The disk 14 reflects the illuminating beam focused thereon back through the objective lens 24 to beamsplitting arrangement 20. Those skilled in the art will appreciate that the beamsplitting arrangement 20 may include a first beamsplitter (not shown) to redirect a first portion of the reflected illuminating beam in order to form the servo beam S. The beamsplitting arrangement 20 will also generally include a second beamsplitter (not shown) to redirect a second portion of the reflected illuminating beam to create a data beam. Such a data beam carries information stored on the optical disk 14. The servo beam S is intercepted by the FTR prism 30, the design and construction of which is discussed more fully hereinafter.

As is also described more fully below, the servo beam S is divided into a transmitted beam T and a reflected beam R by the FTR prism 30. In the embodiment of FIG. 1 the transmitted and reflected beams T,R are of substantially equal cross section and intensity. The transmitted beam T is incident on a first quad detector 32, while the reflected beam R is incident on a second quad detector 34. Electrical signals produced by the quad detectors 32, 34 in response to the intensity distributions of the transmitted and reflected beams T, R are utilized by a control unit 37 to generate a differential focus error signal (DFES) indicative of the focus of the illuminating beam I on the disk 14. One preferred embodiment of a control unit 37 and associated method for generating the DFES is discussed hereinafter. The focus error signal may, for example, be used to control a mechanical arrangement (not shown) disposed to adjust the focus of the illuminating beam I by altering the displacement of the objective lens 24 relative to the disk 14.

Figures 2, 3:
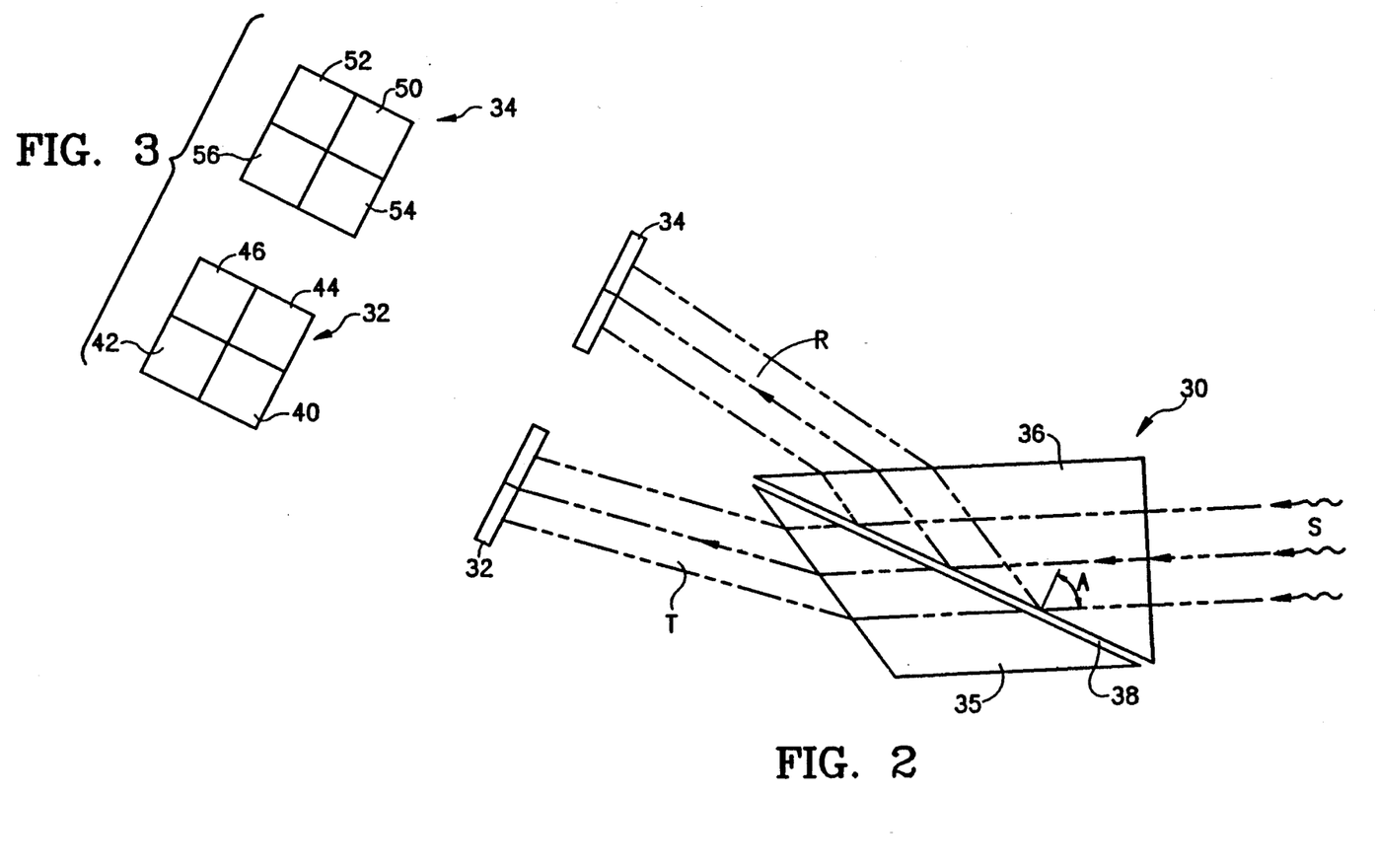
FIG. 2 is a magnified top cross-sectional view of a differential version of the inventive beam separation module (FTR prism).
FIG. 3 is an illustrative front view of the first and second quad detectors included within the inventive focus sensing apparatus.

FIG. 2 shows a magnified top cross-sectional view of the FTR prism 30. The prism 30 includes first and second optical members 35, 36 which sandwich a separation layer 38. The optical members 35, 36 may be realized from glass having an index of refraction larger than that of the separation layer 38. For example, in one preferred embodiment the optical members 35, 36 may be manufactured from glass having an index of refraction of 1.55, while the separation layer 38 is composed of a solid such as either magnesium fluoride ($MgF_2$) or fused silica ($SiO_2$) having indices of refraction of 1.38 and 1.48, respectively. The separation layer 38 need not consist of a solid, and may be realized from a liquid or air provided that the optical members 35, 36 are of a larger index of refraction.

A brief decription of the physics of the interaction of the light in beam S with layer 38 is as follows. If layer 38 and optical member 35 are not present, the well-known phenomenon of total internal reflection takes place at the hypotenuse face of optical member 36, sending all of beam S in the direction of beam R. However, some light energy exists behind the hypotenuse face of optical member 36 in the form of "evanescent waves", which do not propagate. When optical member 35 is brought close enough to optical member 36, this energy is coupled without loss into member 35 and propagates in the direction of beam T. This phenomenon is known as frustrated total reflection (FTR). In this condition, if the FTR prism is disposed with respect to beam S such that the incidence angle A of beam S at seperation layer 38 is close to the region of frustrated total reflection, the transmission and reflection curves will have very steep slopes (angular sensitivities). This allows the fabrication of a very sensitive focus sensing system. Further, the transmission and reflection curves for such a system based on the FTR priciple will be relatively insensitive to the wavelength of the light in beam S, as compared to the curves of a multilayer structure.

The prism 30 may be fabricated by first depositing the separation layer on either of the optical members via conventional thin film techniques. The complementary optical member may then be affixed to the exposed surface of the separation layer with an optical glue. Although the indices of refraction of the first and second optical members 35, 36 will generally be chosen to be identical, differing indices of refraction may also be selected. In the preferred embodiment, the first and second optical members have identical indices of refraction in such a geometry that the transmitted and reflected beams T and R are of substantially equal cross-section.

As shown in the illustrative front view of FIG. 3, the first quad detector 32 includes first, second, third and fourth photodetective elements 40, 42, 44, 46, respectively, which produce electrical signals hereinafter referred to as T1, T2, T3, and T4 in response to the intensity of the transmitted beam T impinging thereon. Similarly, the second quad detector 34 includes fifth, sixth, seventh and eighth photodetective elements 50, 52, 54, 56, respectively, which provide electrical signals hereinafter referred to as R1, R2, R3 and R4 in response to incidence of the reflected beam R. The photodetective elements may be realized by PIN diodes, wherein the level of the electrical output from each diode is proportional to the optical energy received thereby.

When the objective lens 24 (FIG. 1) is situated relative to the disk 14 such that the illuminating beam I is properly focused, the rays included within the servo beam are well collimated (i.e. substantially parallel) and are therefore incident on the separation layer 38 at a substantially identical angle A shown in FIG. 2. Contrary to this, when the objective lens 24 does not focus the illuminating beam in the plane occupied by the surface of the disk 14 the rays comprising the servo beam S will be either mutually convergent or divergent. It follows that all rays within the servo beam S will impinge on the separation layer 38 at the substantially same angle when the illuminating beam I is suitably focused, while rays of a different range of angles of incidence will address the separation layer 38 when the beam I is out of focus.

The prism 30 is designed such that the reflectivity and transmissivity of the separation layer 38 is extremely sensitive to the angle at which optical energy is incident on the separation layer 38. Thus, the spatial distribution in the intensity of the transmitted and reflected beams T, R will vary as the focus position of the illuminating beam I varies relative to the surface of the disk 14. That is, an illuminating beam I which is properly focused gives rise to a well collimated servo beam S such that all the rays thereof experience the same degree of reflection by the separation layer 38. Accordingly, the transmitted and reflected beams T, R will be of substantially uniform intensity when the illuminating beam I is appropriately focused. Conversely, a convergent or divergent servo beam S will engender transmitted and reflected beams T, R of nonuniform spatial intensity distributions since the rays within the servo beam S will be subject to a variety of degrees of reflection by the separation layer 38. By detecting these spatial variations in the intensity of the transmitted and reflected beams the photodetectors 32, 34 produce electrical signals which may be utilized to produce a DFES indicative of the focus position of the illuminating beam I.

Figure 4:
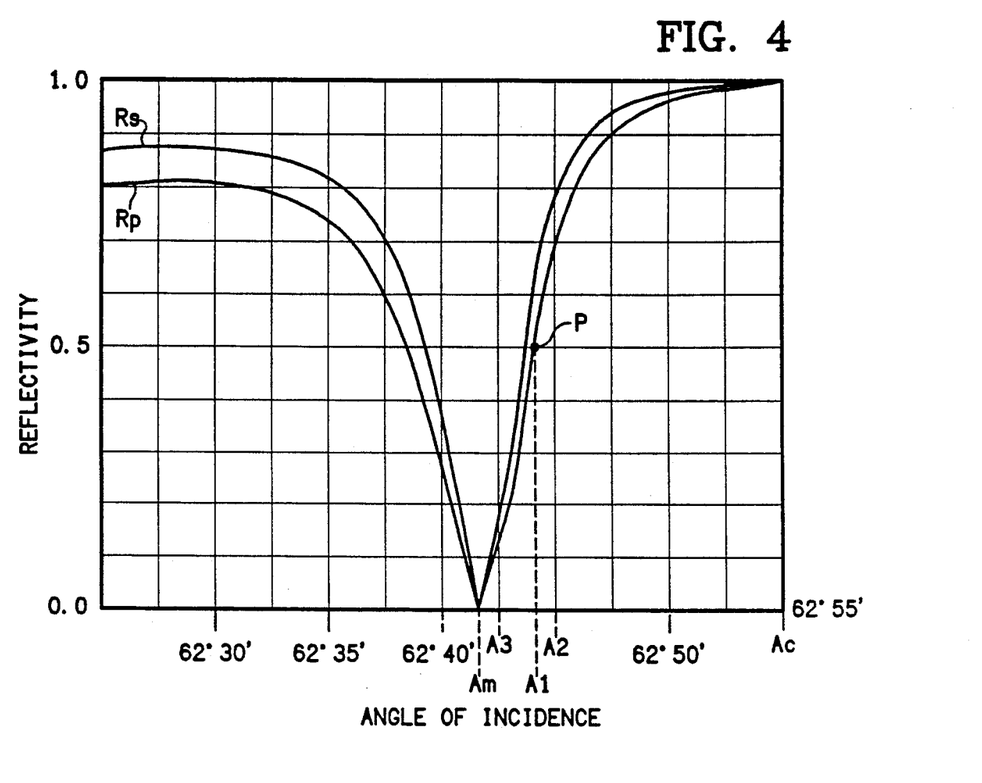
FIG. 4 is a graph showing the reflectivity of the FTR prism as a function of the angle of incidence of the servo beam.

The manner in which a DFES may be synthesized in response to the degree of collimation of the servo beam S may be further understood with reference to FIG. 4. FIG. 4 is a graph showing the reflectivity (intensity of beam R/intensity of beam S) of the FTR prism 30 as a function of the angle of incidence of rays within the servo beam S relative to the separation layer 38. Specifically, the graph of FIG. 4 depicts the reflectivities Rs and Rp of the prism 30 in response to illumination by both s-polarized and p-polarized optical energy of wavelength 0.78 microns. The reflectivity profiles of FIG. 4 pertain to a FTR prism 30 having a separation layer with a thickness of 4.5 microns and an index of refraction of 1.38, with the separation layer being sandwiched by glass members having an index of refraction of 1.55. As shown in FIG. 4, the prism 30 is preferably positioned relative to the servo beam S at an angle of incidence $A_1$ such that the prism 30 is operative about a working point P. That is, at the working point P the prism 30 is positioned such that an illuminating beam I properly focused on the disk 14 engenders a well collimated servo beam S having rays which impinge on the separation layer 38 at the angle $A_1$. Since the reflectivity of the prism 30 is approximately 0.5 at the operating point P, the transmitted and reflected beams produced by the module 30 are of substantially identical average intensity.

When the separation between the objective lens 24 and the disk 14 varies such that the servo beam S decollimates in either a convergent or divergent manner, a first portion thereof will impinge on the separation layer 38 at an angle of incidence larger than the angle $A_1$. For example, at an angle of incidence of $A_2$ (FIG. 4) a corresponding portion of the servo beam will experience a reflectivity of approximately 0.7. Since the first servo beam portion is subject to a reflectivity of only 0.5 when the servo beam S is well collimated, the regions of the detectors 32, 34 which receive the parts of the reflected and transmitted beams R, T derived from the first servo beam portion will collect more and less optical energy, respectively, than when the illumination beam I is properly focused. Similarly, the areas of the detectors 32, 34 in optical alignment with parts of the transmitted and reflected beams T, R arising from a second portion of the servo beam S incident on the separation layer 38 at an angle of incidence $A_3$ (smaller than the angle $A1$) will be illuminated by more and less optical energy, respectively, than in a condition of proper focus. The DFES is produced in response to electrical signals engendered by the photodetectors 32, 34 indicative of this spatial nonuniformity in the intensity distribution of the transmitted and reflected beams T, R. Moreover, since in the preferred embodiments described herein the module 30 is optically nonabsorbing, variation in the intensity of the transmitted beam T arising from a change in the angle of incidence of a portion of the servo beam S is mirrored by an equal, oppositely directed variation in the magnitude of the part of the reflected beam R engendered by the identical servo beam portion.

Non-differential error signals may be generated independently from either the transmitted or reflected beam, using the equations:

$$FES(transmitted) = (T1 + T2) - (T3 + T4) \quad [1]$$

$$FES(reflected) = (R1 + R2) - (R3 + R4) \quad [2]$$

In the differential system, the differential focus error signal (DFES) is generated by the control unit 37 in accordance with the following expression:

$$DFES = (R1 + R2 + T3 + T4) - (T1 + T2 + R3 + R4) \quad [3]$$

The control unit 37 includes circuitry suitable for carrying out the arithmetic operations of equation [3] and for generating a DFES based on these operations. Preamplifiers (not shown) are included to amplify the electrical signals from the photodetectors 32, 34 prior to processing by the control unit 37.

Utilizing the dual quad photodetector arrangement described herein leads to the synthesis of differential focus error signals having a reduced sensitivity to certain beam imperfections not induced by inaccuracies in the focus position of the illuminating beam relative to the disk 14. Since a localized decrease in the intensity of the servo beam S unrelated to the focus position of the illuminating beam affects the detectors 32 and 34 in a substantially similar manner, such a decrease does not affect the value of the DFES due to the corresponding cancellation which occurs in equation [3].

As mentioned in the Background of the Invention, prior focusing systems were generally ill-equipped to implement the differential focus sensing scheme described by equation [3]. In particular, a feature of the present invention lies in the ability of the FTR prism 30 to provide transmitted and reflected beams of substantially similar cross section and intensity such that both may effectively contribute to the synthesis of a DFES.

In addition to providing a DFES for maintaining the focus of the illuminating beam I in the direction normal to the surface of the disk 14, the electrical outputs from the photodetectors 32, 34 may also be used by the control unit 37 to generate a tracking error signal (TES). The TES is indicative of the radial position of the illuminating beam I relative to the conventional spiral or concentric guiding tracks (not shown) imprinted on the surface of the disk 14. The TES enables the beam I to follow the guiding tracks despite eccentricities therein by controlling a mechanical arrangement (not shown) operative to adjust the radial position of the objective lens 24 relative to the disk 14. The TES is calculated by the control unit 37 on the basis of electrical outputs from the photodetectors 32, 34 in accordance with the following equation:

$$TES = (T1 + T3 + R3 + R1) - (T2 + T4 + R2 + R4) \quad [4]$$

Again, the manner in which a tracking error signal may be derived from the relationship existing between spatial intensity changes of the servo beam and the tracking position of the illuminating beam is disclosed in, for example, U.S. Pat. No. 4,707,648.

In perhaps the majority of systems operative to control the focus of an illuminating beam relative to an optical disk it will be desired to generate both tracking and focus error signals in response to the electrical outputs of the photodetective elements. Since generation of both the focus and tracking error signals is known to generally require at least one quad photodetector, the embodiments of the present invention disclosed herein have been described with reference to quad photodetectors. However, it is also known that a focus error signal may be derived on the basis of electrical signals produced by photodetectors having only two independent photosensitive regions (bicell detectors). Accordingly, in applications requiring only the generation of a focus error signal a single photodetective element could be substituted for the first and second elements 40, 42 of the photodetector 32, and a single photodetective element could replace the third and fourth elements 44, 46. Similarly, a single photodetective element could be used in lieu of the fifth and sixth elements 50, 52 of the photodetector 34, and a single element could be substituted for the seventh and eighth elements 54, 56.

The slope of the reflectivity profile of FIG. 4 about the working point P is proportional to the sensitivity of the DFES generated by the apparatus 10. Specifically, the sensitivity of the apparatus 10 to changes in the focus of the illuminating beam I is augmented by increases in the slope of the reflectivity profile. Accordingly, it is an object of the present invention to provide a prism 30 characterized by a reflectivity profile which is as steep as practically possible.

The shape of the reflectivity profile of FIG. 4 about the working point P may be altered by adjusting the thickness of the separation layer 38. For example, increasing the thickness of the separation layer 38 translates the angle of minimum reflectivity $A_m$ towards the critical angle $A_c$ (see FIG. 4) without affecting the value of the latter. It follows that increasing the separation layer thickness serves to increase the slope of the reflectivity profile in the vicinity of the working point P. Similarly, reducing the thickness of the separation layer 38 enlarges the angular displacement between the critical angle $A_c$ and the angle of minimum reflectivity $A_m$. The shape of the reflectivity profile of the prism 30 may be varied in order to adjust the sensitivity of the DFES. A reasonable slope can be obtained, for example, by use of a separation layer having a thickness that is greater than one half of the wavelength of the illuminating beam I.

The value of the critical angle $A_c$ may be adjusted by varying the index of refraction of the separation layer 38 relative to that of the glass members 35, 36. Thus, adjustment of the separation layer thickness in conjunction with manipulation of the indices of refraction of the separation layer and surrounding glass members allows the prism 30 to be fabricated in accordance with a desired reflectivity profile.

Figure 5:
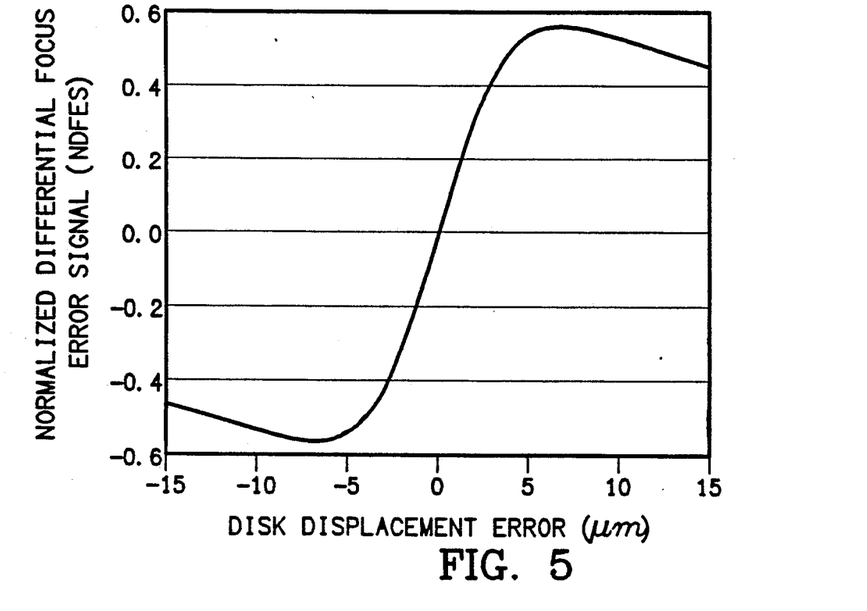
FIG. 5 is a graph of the value of a differential focus error signal generated by a preferred embodiment of the apparatus of the present invention as a function of the position of the objective lens relative to an optical disk.

FIG. 5 is a graph of the value of a normalized DFES (NDFES) generated by the apparatus 10 as a function of the deviation from the desired displacement of the objective lens 24 relative to the disk 14. NDFES is mathematically represented as follows:

$$NDFES = \frac{DFES}{(T1 + T2 + T3 + T4 + R1 + R2 + R3 + R4)} \quad [5]$$

Again, the data in FIG. 5 was obtained by utilizing a prism 30 having a separation layer of index of refraction 1.38 and thickness 4.5 microns sandwiched between glass members of index of refraction 1.55, with the prism 30 being illuminated by a servo beam of wavelength 0.78 microns. As is shown in FIG. 5, the value of the DFES is preferably zero when the desired displacement exists between the objective lens 24 and the disk 14. The sign (+ or −) of the DFES is thus indicative of whether the displacement between the objective lens and disk surface exceeds or is less than that required for proper focusing. As mentioned above, the DFES may be used to control a mechanical arrangement (not shown) disposed to adjust the separation between the objective lens 24 and the disk 14. It may be appreciated that the slope of the NDFES is approximately 0.16 micron$^{-1}$ at the working point defined by 0 (zero) disk displacement.

Although the servo beam S has been represented herein to be substantially collimated when incident on the separation layer 38, the present invention is not limited to configurations giving rise to collimated servo beams. When a convergent or divergent servo beam is utilized, inaccuracies in the focus position of the illuminating beam will alter the degree of convergence or divergence thereof. Those skilled in the art will appreciate that the focus sensing apparatus of the present invention may be utilized to generate a DFES in response to such changes in convergence or divergence.

The inventive focus sensing apparatus has thus been shown to overcome the disadvantages inherent in other focus detection systems by providing reflected and transmitted beams of substantially similar shape and intensity from which a high precision, altitude insensitive focus error signal may be differentially derived. The focus sensing technique disclosed herein nonetheless retains features present in certain related focus detection systems such as low sensitivity to mechanical vibration, decreased sensitivity to disk tilt, and increased thermal stability.

Although the invention has been described herein as used in particular applications associated with focus sensing, the invention applies to the more general field of beam geometry evaluation. It is not intended that the scope of the invention be limited to the specific embodiments described herein, since the invention finds application in the evaluation of radiation beam geometry generally, regardless of what defines this beam geometry.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A focus sensing apparatus comprising:
a source of radiation energy;
means for focusing radiation from the radiation energy source upon an object;
means for separating at least a portion of radiation reflected by said object into transmitted and reflected beams, comprising a separation layer, made from a single layer of material having a substantially uniform index of refraction, which varies in reflectivity in response to the angle of incidence of said reflected radiation interposed between a first optical member and a second optical member; and
photodetector means for detecting the intensities of said transmitted and reflected beams.

2. The focus sensing apparatus of claim 1, wherein the radiation from the radiation energy source include radiation energy of a first wavelength and said separation layer is of a predetermined thickness greater than one half of said first wavelength.

3. The focus sensing apparatus of claim 1, wherein said first and second optical members are of a first index of refraction, and wherein said separation layer is of a second index of refraction less than said first index of refraction.

4. The focus sensing apparatus of claim 1, wherein said first and second optical members are of first and third indices of refraction, and wherein said separation layer is of a second index of refraction less than said first and third indices of refraction.

5. The focus sensing apparatus of claim 1, further comprising means for detecting variation in the intensity distributions of the transmitted and reflected beams, and thereby providing an indication as to the extent to which the radiation from the radiation energy source is not focused on the object.

6. The focus sensing apparatus of claim 1, wherein the beam separation means comprises a frustrated total reflection prism.

7. The focus sensing apparatus of claim 1, wherein the radiation energy comprises light energy.

8. The focus sensing apparatus of claim 1, wherein said separation layer is comprised of a solid.

9. The focus sensing apparatus of claim 1, wherein said separation layer is comprised of air.

10. The focus sensing apparatus of claim 1 wherein said photodetector arrangement includes a first photodetector in optical alignment with said transmitted beam, and a second photodetector in optical alignment with said reflected beam.

11. The focus sensing apparatus of claim 10 further including a control unit, in electrical communication with said first and second photodetectors, for generating a differential focus error signal.

12. The focus sensing apparatus of claim 1, wherein the radiation from the radiation energy source includes radiation energy of a first wavelength and said separation layer is of a predetermined thickness greater than said first wavelength.

13. The focus sensing apparatus of claim 12, wherein said separating means is oriented so that said reflected radiation impinges upon said separation layer at an angle of incidence having an angular value within a selected continuous range of angular values between a critical angle of a first angular value and a next adjacent angle of minimum reflectance having a second angular value, and wherein said second angular value is less than said first angular value;

14. A focus sensing apparatus comprising:
a light source for generating a light beam;
an objective lens for focusing said light beam upon an object;
a beam separation module for separating at least a portion of light reflected by said object into transmitted and reflected beams, said separation module including a separation layer, said separation layer comprising a single layer of material, which varies in reflectivity in response to the angle of incidence of said reflected light;
beamsplitting means for directing at least a portion of said reflected light to said beam separation module, said beam separation module disposed with respect to said beamsplitting means such that said portion of said reflected light impinges on said separation layer at an angle of incidence having an angular value within a selected continuous range of angular values between a critical angle of a first angular value and a next adjacent angle of minimum relfectance having a second angular value, wherein said second angular value is less than said first angular value; and a photodetector arrangement for detecting the intensities of said transmitted and reflected beams.

15. The focus sensing apparatus of claim 14, wherein the beam separation module comprises a frustrated total reflection prism.

16. The focus sensing apparatus of claim 14 wherein said beam separation module includes first and second optical members, said optical members being arranged so as to sandwich said separation layer.

17. The focus sensing apparatus of claim 16 wherein said first and second optical members are of a first index of refraction, and wherein said separation layer is of a second index of refraction less than said first index of refraction.

18. The focus sensing apparatus of claim 18, wherein said light beam includes optical energy of a first wavelength and said separation layer is of a thickness greater than one half of said first wavelength.

19. A beam separation module for separating an input beam of radiation energy, including radiation energy of a first wavelength, into transmitted and reflected beams, said separation module comprising:

a first optical member of a first selected index of refraction;

a second optical member of a second selected index of refraction; and a separation layer positioned between the first and second optical members, wherein said separation layer comprises a single layer of material having an index of refraction that is less than the first and second selected indices of refraction and said separation layer is of a thickness greater than said one half of said first wavelength.

20. A beam separation module as defined in claim 19 wherein the first and second indices of refraction are substantially the same.

21. A beam separation module as defined in claim 19 wherein the input beam of radiation includes radiation energy of a first wavelength and the separation layer is of a thickness greater than one half of said first wavelength.

22. The beam separation module of claim 19, wherein said input beam inpings upon said separation layer at an angle of incidence having an angular value within a selected continuous range of angular values between a critical angle of a first angular value and a next adjacent angle of minimum reflectance having a second angular value and wherein said second angular value is less than said first angular value, to thereby create said transmitted beam and said reflected beam.

23. A beam separation module for separating an input beam of radiation energy of a first wavelength into transmitted and reflected beams, said separation module including a separation layer, comprising a single layer of material of a thickness larger than one half of said first wavelength that reflects a portion of the input beam and transmits another portion of the input beam to form said reflected and transmitted beams when said input beam impinges on said separation layer at an angle of incidence with an angular value within a selected continuous range of angular values between a critical angle of a first angular value and a next adjacent angle of minimum reflectance of a second angular value wherein said second angular value is less than said first angular value, said separation layer being of an optical construction that varies in reflectivity in response to the angle of incidence of said optical energy.

24. A focus sensor, comprising:

a light source;

means for focusing light from the light source upon an object;

means for separating at least a portion of light reflected by the object into a transmitted beam of a first intensity distribution and a reflected beam of a second intensity distribution, said separating means being configured such that said transmitted and reflected beams are of a substantially similar intensity distribution when the light is in focus on the object, and such that the spatial variation in the intensity of the transmitted beam is mirrored by a substantially equal and opposite spatial variation in the intensity of the reflected beam when the focus of the light deviates from the object, said separating means including a separating layer comprising a single layer of material with a substantially uniform index of refraction of a thickness greater than one half of a wavelength of the light reflected from said object; and means for providing an indication of the spatial intensity variation.

25. A focus sensor as defined in claim 24, wherein the separating means comprises:

a first optical member of a first selected index of refraction;

a second optical member of a second selected index of refraction; and wherein said separation layer is positioned between the first and second optical members, and wherein said separation layer is of an index of refraction that is less than the first and second selected indices of refraction.

26. The focus sensor of claim 15 wherein the light from the light source includes optical energy of a first wavelength and said separation layer is of a thickness greater than one half of said first wavelength.

27. A focus sensor as defined in claim 23, wherein the first and second selected indices of refraction are substantially the same.

28. The focus sensor as defined in claim 27, wherein when said light is in focus on said object said reflected light impinges upon said separation layer at a angle of incidence comprising a working point angle of incidence and wherein said working point angle of incidence is within a selected continuous range of angular values between a critical angle of a first angular value and a next adjacent angle of minimum reflectance having a second angular value, wherein said second angular value is less than said first angular value.

29. The focus sensor as defined in claim 28, wherein said angle of incidence of said reflected light varies proportionately about said working point angle when said light is not in focus on said object.

30. A focus sensor, comprising:

a light source of producing an optical beam;

an objective lens arrangement for focusing the beam upon an object, said arrangement including a polarization beam splitter and an objective lens;

a beam separation module including a separation layer made of a single layer of material, for separating at least a portion of light reflected by the object into a transmitted beam of a first intensity distribution and a reflected beam of a second intensity distribution, said beam separation module configured such that said reflected light impinges upon said separation layer at an angle of incidence having an angular value within a selected continuous range of angular values between a critical angle of a first angular value and a next adjacent angle of minimum reflectance of a second angular value, wherein said second angular value is less than said first angular value and, when said optical beam is in focus on the object, said reflected light impinges on said separation layer at a working point angle of incidence thereby producing said transmitted and reflected beams with a substantially similar intensity distribution, said beam separation module further configured such that the variation in the intensity distribution of the transmitted beam is mirrored by a substantially equal and opposite variation in the intensity distribution of the reflected beam when the focus of the light deviates from the object and causes said reflected light to impinge at an angle of incidence with an angular value different from the angular value of said working point angle; and first and second photodetectors in optical alignment with said transmitted and reflected beams, respectively, for providing first and second signals indicative of the variation in the intensity distribution of the transmitted and reflected beams.

31. A beam evaluation system for evaluating geometry of an input beam of radiation energy, comprising:
first and second optical members;
a separation layer comprising a single layer of material sandwiched between the first and second optical members in a configuration such that said input beam impinges upon said separation layer at an angle of incidence having an angular value within a selected continuous range of angular values between a critical angle of a first angular value and a next adjacent angle of minimum reflectance having a second angular value, wherein said second angular value is less than said first angular value, thereby producing transmitted and reflected beams; and
means responsive to at least one of the transmitted and reflected beams for identifying geometry characteristics of the input beam.

32. A beam evaluation system as defined in claim 31, wherein the input beam is of a first wavelength and wherein the separation layer is of a thickness that is larger than one half of said first wavelength.

33. A beam evaluation system as defined in claim 31, wherein the first optical member is of a first selected index of refraction, the second optical member is of a second selected index of refraction, and the separation layer is of an index of refraction that is less than the first and second selected indices of refraction.

34. A beam evaluation system as defined in claim 33 wherein the first and second selected indices of refraction are substantially the same.

35. A focus sensing apparatus comprising:
a radiation source;
an optical member for focusing radiation from the radiation source upon an object;
a frustrated total reflection prism for receiving radiation reflected from the object and for providing a reflected radiation beam and a transmitted radiation beam, said frustrated total reflection prism comprising first and second optical members and a separation layer interposed between said first and second optical members, wherein said separation layer comprises a single layer of material with an index of refraction less than the index of refraction of either said first or second optical members, said frustrated total reflection prism disposed with respect to the radiation reflected from said object such that said reflected radiation impinges on said separation layer at an angle of incidence having an angular value within a continuous range of angular values between a critical angle with a first angular value and a next adjacent minimum angle with a second angular value wherein said first angular value is greater than said second angular value; and
means for detecting a characteristic of one of the reflected and transmitted beams.

36. A focus sensing apparatus as defined in claim 35, further comprising means responsive to the detecting means for providing an indication as to the extent to which the radiation from the radiation source is not focused on the object.

37. A focus sensing apparatus as defined in claim 35, further comprising means for detecting a characteristic of the other of the reflected and transmitted beams.

38. A focus sensing apparatus as defined in claim 37, wherein the means for detecting characteristics of the reflected beam and the means for detecting characteristics of the transmitted beam comprising photodetectors for detecting intensities of said reflected and transmitted beams.

39. A method of sensing focus between a radiation source and an object comprising the steps of:
positioning a frustrated total reflection prism, comprised of a separation layer made of a single layer of material interposed between a first optical member and a second optical member, at a location so as to receive radiation reflected from the object and to provide therefrom a reflected radiation beam and a transmitted radiation beam; and
detecting characteristics of one of the reflected and transmitted beams.

40. A method of sensing focus as defined in claim 39, further comprising the step of providing, in response to the detecting step, an indication as to the extent to which the radiation from the radiation source is not focused on the object.

41. The method of sensing focus between a radiation source and an object as defined by claim 40, wherein the positioning step further comprises positioning said frustrated total reflection prism so that said reflected radiation impinges upon said separation layer at an angle of incidence having an angular value within a selected continuous range of angular values between a critical angle of a first angular value and a next adjacent angle of minimum reflectance having a second angular value, wherein said second angular value is less than said first angular value.

42. A method of sensing focus as defined in claim 40, further comprising the step of detecting a characteristic of the other of the reflected and transmitted beams.

43. A method of sensing focus as defined in claim 42, wherein the steps of detecting characteristics of the reflected beam and detecting characteristics of the transmitted beam comprise the step of detecting the intensities of said reflected and transmitted beams.

44. A method of evaluating geometry of an input beam of radiation energy, comprising the steps of:

providing first and second optical members;
sandwiching a separation layer, comprised of a single layer of material with a substantially uniform index of refraction, between the first and second optical members in a configuration such that the input beam impinges on said separation layer at an angle of incidence having an angular value within a selected continuous range of angular values between a critical angle of a first angular value and a next adjacent angle of minimum reflectance having a second angular value where said second angular value is less than said first angular value thereby producing transmitted and reflected beams; and
monitoring at least one of the transmitted and reflected beams to identify geometry characteristics of the input beam.

* * * * *